US011263668B2

(12) United States Patent
Choi

(10) Patent No.: US 11,263,668 B2
(45) Date of Patent: Mar. 1, 2022

(54) PRESS RELEASE DISTRIBUTION SYSTEM

(71) Applicant: NATIVO, INC., El Segundo, CA (US)

(72) Inventor: Justin Choi, Newport Coast, CA (US)

(73) Assignee: NATIVO, INC., El Segundo, CA (US)

( * ) Notice: Subject to any disclaimer, the term of this patent is extended or adjusted under 35 U.S.C. 154(b) by 402 days.

(21) Appl. No.: 15/485,153

(22) Filed: Apr. 11, 2017

(65) Prior Publication Data
US 2018/0068351 A1 Mar. 8, 2018

Related U.S. Application Data

(63) Continuation of application No. 15/069,908, filed on Mar. 14, 2016, now Pat. No. 9,652,781, which is a continuation of application No. 13/871,794, filed on Apr. 26, 2013, now Pat. No. 9,286,622, which is a continuation of application No. 11/772,014, filed on Jun. 29, 2007, now Pat. No. 9,646,324.

(60) Provisional application No. 60/817,771, filed on Jun. 29, 2006.

(51) Int. Cl.
*G06Q 30/00* (2012.01)
*G06Q 30/02* (2012.01)

(52) U.S. Cl.
CPC ........ *G06Q 30/0271* (2013.01); *G06Q 30/00* (2013.01); *G06Q 30/0246* (2013.01); *G06Q 30/0255* (2013.01); *G06Q 30/0256* (2013.01); *G06Q 30/0269* (2013.01); *G06Q 30/0277* (2013.01); *G06Q 30/0241* (2013.01); *G06Q 30/0251* (2013.01)

(58) Field of Classification Search
CPC .......................... G06Q 30/02; G06Q 30/0241
See application file for complete search history.

(56) References Cited

U.S. PATENT DOCUMENTS

| 5,948,061 | A | 9/1999 | Merrimen et al. |
|---|---|---|---|
| 6,442,529 | B1 | 8/2002 | Krishnan et al. |
| 6,460,036 | B1 | 10/2002 | Herz |
| 6,571,234 | B1 * | 5/2003 | Knight ................. G06Q 10/10 |
| 6,907,566 | B1 | 6/2005 | McElfresh et al. |
| 7,007,074 | B2 | 2/2006 | Radwin |

(Continued)

OTHER PUBLICATIONS

Message Board Blaster!, messageboardblaster.com, Mar. 1, 2005, homepage and FAQs (Year: 2005).*

*Primary Examiner* — Meredith A Long
(74) *Attorney, Agent, or Firm* — Lewis Roca Rothgerber Christie LLP

(57) ABSTRACT

A press release distribution system provides press release and other news to forum sites as posts. The forum software that runs at forum sites includes press release interface software or is adapted to receive press release interface plug-in modules for interfacing with the press release distribution system. The press release interface software or plug-in module may also monitor and/or analyze user data of forum members and/or forum activities of the users. The monitored user data and forum activities may be provided to the press release distribution system for analysis and generation of user profiles. Using the result of the analysis (e.g., user profiles), the press release distribution system can target particular users or forums to direct the press releases, news, or advertisements for most effective advertising campaign.

34 Claims, 7 Drawing Sheets

(56) References Cited

U.S. PATENT DOCUMENTS

| | | | |
|---|---|---|---|
| 7,801,905 B1* | 9/2010 | Singh | G06F 11/3495 |
| | | | 707/758 |
| 8,364,521 B2 | 1/2013 | Ramer et al. | |
| 2002/0065802 A1* | 5/2002 | Uchiyama | G06F 16/9535 |
| 2003/0028441 A1* | 2/2003 | Barsness | G06Q 30/0601 |
| | | | 705/26.1 |
| 2003/0070167 A1 | 4/2003 | Holtz et al. | |
| 2003/0191689 A1 | 10/2003 | Bosarge et al. | |
| 2005/0021521 A1* | 1/2005 | Wycoff | G06Q 30/02 |
| 2005/0125290 A1 | 6/2005 | Beyda et al. | |
| 2005/0144067 A1 | 6/2005 | Farahat et al. | |
| 2005/0144073 A1 | 6/2005 | Morrisroe et al. | |
| 2005/0165644 A1 | 7/2005 | Beyda et al. | |
| 2005/0187818 A1 | 8/2005 | Zito et al. | |
| 2005/0203797 A1 | 9/2005 | Isobe et al. | |
| 2006/0026063 A1 | 2/2006 | Collins | |
| 2006/0143084 A1 | 6/2006 | Donnelli et al. | |

* cited by examiner

FIG. 6

PRESS RELEASE DISTRIBUTION SYSTEM

CROSS-REFERENCE TO RELATED APPLICATIONS

This application is a continuation of U.S. patent application Ser. No. 15/069,908, filed Mar. 14, 2016, which is a continuation of U.S. patent application Ser. No. 13/871,794 filed Apr. 26, 2013, which is a continuation of U.S. patent application Ser. No. 11/772,014 filed Jun. 29, 2007, which claims the benefit of U.S. Provisional Application No. 60/817,771 filed Jun. 29, 2006, the entire contents of each which is incorporated by reference herein.

FIELD OF THE INVENTION

The present invention relates to online brand marketing and monitoring.

BACKGROUND

Global computer networks, such as the Internet, are increasingly being used for marketing and advertisements, encroaching into advertising markets traditionally reserved for printed media (e.g., newspapers and magazine) and/or television. Online advertisements often appear on web sites or web pages of the World Wide Web (WWW) in a form of banner ads, or the like. There are also other web sites that are fan sites (or forum sites) utilized for discussing particular interests or hobbies. These fan sites normally consist of message forums and other venues for disseminating information over the global computer networks, are being used to portray certain products or brands in a positive or negative light, and can be important sources of consumer feedback for advertisers, manufacturers and consumers alike.

Since these fan sites tend to have smaller audiences, one should advertise across many of them to reach a sizable market. While this market is highly desirable, the problem is that one needs to work through many different sites to reach the market. Also, since each fan site typically requires a fee for placing an advertisement, it is impractical or impossible to place advertisements on each and every one of them. Therefore, the advertisers, manufacturers or those seeking to reach the market through the fan sites must select the right fan sites on which to place their advertisements. Further, these sites tend to be less professional than typical larger sites (Yahoo, CNN, etc.) that sell ad spaces so it is desirable to have them fit into a set standard for distributing and processing ads.

Due to a generally large number of fan sites available for placing advertisements, it is often very difficult and time consuming to select those relatively few fan sites to run advertisements. For one thing, it is often difficult to identify those fan sites that are frequented by a number of potential customers. Further, it is even more difficult to measure the effectiveness of the advertisements placed on any particular fan site.

Such difficulties in identifying the target fan sites are even more pronounced when the brands being advertised or marketed are for a niche market such as the automotive aftermarket industry, for example. The automotive aftermarket is already fragmented into a number of different market segments such as parts for trucks, sport compact cars, domestic performance cars, luxury SUVs, etc. Therefore, it is not an easy task for an aftermarket manufacturer, which is often a small or medium-sized business with limited resources and marketing budget, to select one or more aftermarket car enthusiast fan sites that will serve as an effective venue for its marketing campaign.

Further, although these fan sites typically provide an advertising tracking program, they generally only indicate how many people saw the ad and how many people clicked on it without any further information on ad effectiveness. In addition, the fan site operator typically provides advertising tracking information once in a while by sending an e-mail, for example, and the advertiser has no way of validating their data. Therefore, it is very difficult to quantitatively assess which site is truly better than another site.

Further, since each site has its own paperwork and processes for accepting ads and ad money, ranging from very formal to very informal, an advertiser must spend extra time to track which placement invoices should be coming for which sites and for how long.

To further complicate the matter, the existing banner images may not be ideal for all of the sites that the advertisements are to be placed on. In this case, separate ads should be crafted for certain specific sites, which makes tracking even more complicated and the advertiser must keep track of which ads go to which sites. In addition, when the advertiser's products change and/or a new feature is added, the advertiser must re-do all of his advertising banners to reflect the changes and resubmit them to the appropriate sites. This may involve sending e-mails to all of the various site owners.

Other problems associated with online advertisements and marketing that prevent many businesses from effectively utilizing the web for advertising brands or products include: 1) difficulty in monitoring positive and negative comments on user forums, fan sites and/or the like that can make noticeable impacts on sales, as it is difficult and time consuming to monitor the thousands of user forums and other sites on the web; 2) lack of advertisers' knowledge or expertise in gauging the quality of the vendors' sites and limited availability of tools for measuring the performance of the online placements that are purchased, even when advertisers want to diversify their ad spending and advertising on enthusiast web sites; and 3) difficulty in monitoring unauthorized retailers who sell fake products because small or medium-sized businesses generally cannot afford to spend the time to monitor the entire web for unauthorized dealers.

Therefore, it is desirable to provide tools that will facilitate the advertisers, manufacturers or brand managers to locate the most suitable fan sites that are frequented by the target audience, and to monitor the effectiveness of any advertisements that are placed on these fan sites. Further, it is desirable to provide tools that can be used by the advertisers or manufacturers to monitor dissemination of information regarding their brand names or products over the global computer networks.

SUMMARY OF THE INVENTION

In one exemplary embodiment according to the present invention, a press release distribution system is used to provide press releases, other news, advertisements, messages and/or non-"press" events to the forum sites.

In one exemplary embodiment according to the present invention, the press release distribution system inserts or posts a press release as a message at one or more forum sites.

In one exemplary embodiment according to the present invention, the press release distribution system interfaces with the forum software that runs at each of the forum sites. The forum software may have a built-in software for interfacing with the press release distribution system or may be adapted to receive a press release interface plug-in module for interfacing with the press release distribution system.

In one exemplary embodiment according to the present invention, the component of the press release distribution system that runs at respective forum sites, e.g., the press release interface plug-in, generates a user profile (e.g., a marketing profile) using user data and/or user activities at the forum such as user reads and uploads.

In an exemplary embodiment according to the present invention, a press release distribution system includes a distributor module adapted to receive a press release, and to distribute the press release to one or more forum sites over a network according to relatedness between the press release and the one or more forum sites; at least one input handler module adapted to receive the press release from one or more advertisers, and to provide the press release to the distributor module; and at least one press release poster module adapted to run at respective said one or more forum sites, to receive the press release over the network, and to post the press release as a message at the respective said one or more forum sites.

In another exemplary embodiment according to the present invention, a method of distributing a press release to one or more forum sites, is provided. The method includes: receiving the press release from one or more advertisers; distributing the press release to the one or more forum sites over a network according to relatedness between the press release and the one or more forum sites; and posting the press release as a message at the one or more forum sites.

In exemplary embodiments of the present invention, a brand management system used to provide marketing and monitoring services for brands or products over the global computer networks, includes a press release distribution system.

In another exemplary embodiment according to the present invention, a brand management system coupled to a plurality of web sites over a communications network, is provided. The brand management system includes: a press release distribution system adapted to receive a press release related to an advertiser and provide the press release to one or more forum sites among the plurality of web sites to post as a message, in accordance with relatedness between the press release and the one or more forum sites; a brand monitoring tool adapted to automatically monitor one or more of the web sites for at least one keyword related to a particular brand or product of the advertiser; and an advertisement directory system comprising a directory of web sites that are likely to provide an effective venue for one or more advertisements for the particular brand or product.

These and other aspects of the invention will be more readily comprehended in view of the discussion herein and accompanying drawings.

BRIEF DESCRIPTION OF THE DRAWINGS

FIG. 6 is a schematic view of a screen shot of a forum site home page in an embodiment in accordance with the present invention.

DETAILED DESCRIPTION

Figure 1:
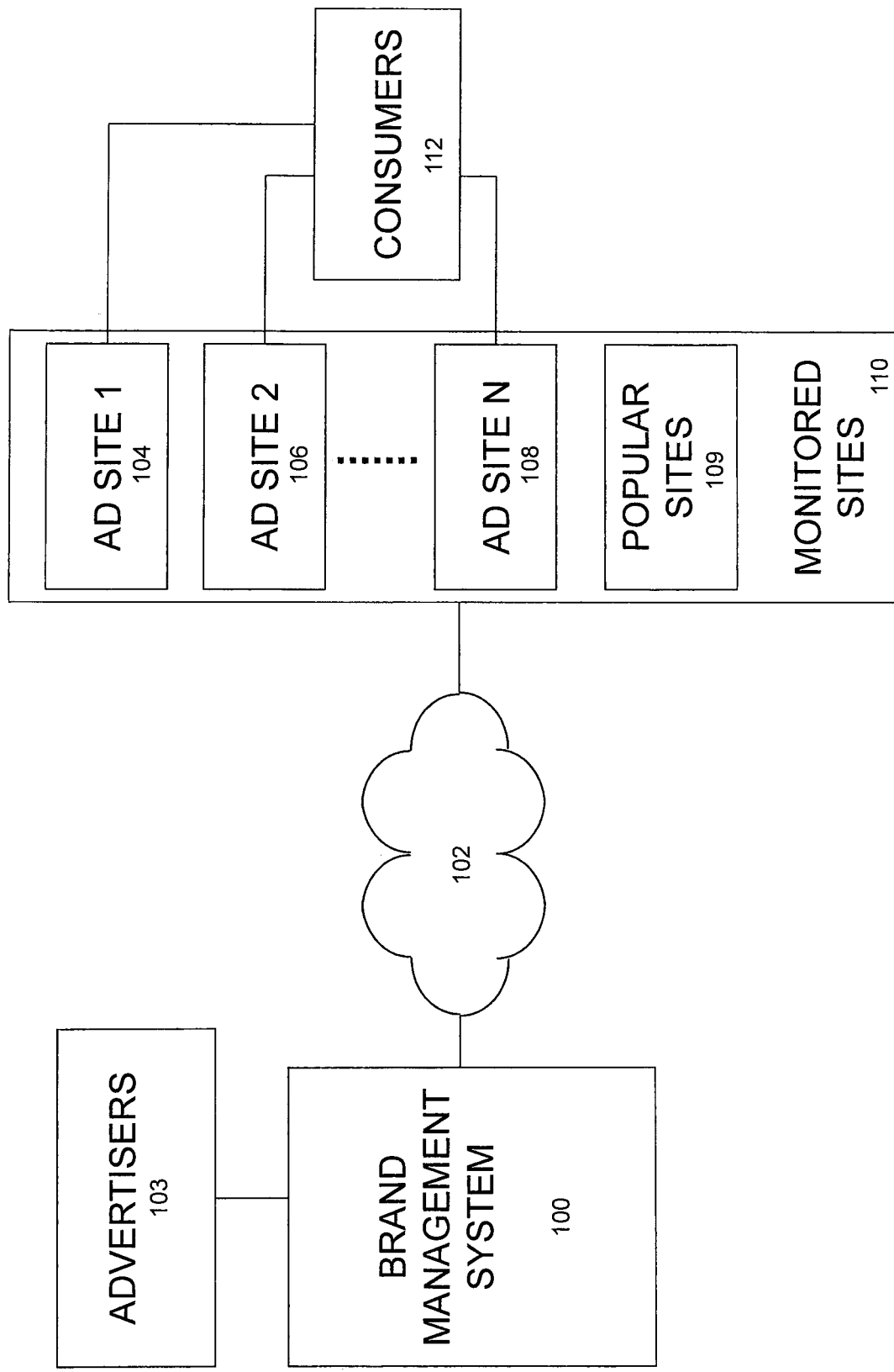
FIG. 1 is a configuration diagram of a brand management system coupled over the global computer networks to advertisers, ad sites, monitored sites, consumers and dealers.

Exemplary embodiments according to the present invention provide a method and apparatus for facilitating targeted advertising of various different brands and monitoring thereof, over global computer networks, including distribution of press releases. This application contains subject matter related to U.S. patent application Ser. No. 11/359,003 filed Feb. 21, 2006, which claims priority to and the benefit of U.S. Provisional Application No. 60/654,163 filed on Feb. 18, 2005, the entire contents of both of which are incorporated herein by reference.

A brand management system or a brand monitoring and marketing system in exemplary embodiments of the present invention is a web-based application suite that provides businesses with the tools necessary to monitor and market their brands online. The system will provide the businesses with one or more of the tools including, but not limited to, a brand monitoring tool, an ad management tool, and a file management tool. The system can aggregate existing tools and/or provide new tools and services that are not currently available. The brand management system in one embodiment also includes a press release distribution system, and a number of press release interface software or plug-in modules running at forum sites to interface with the press release distribution system. The press release distribution system and the press release interface software may together be also referred to as a press release distribution system.

In an exemplary embodiment according to the present invention, the brand management system includes an ad directory system or an ad directory in a form of a web site to link the brand advertisers or manufacturers to various different web sites that are likely to provide an effective venue for marketing and advertisements for particular market segments. The advertisers or manufacturers can view (which can include logging in) the web page on which the directory of web sites is placed, and select one or more web sites based on their particular needs, in accordance with the information provided in the directory.

The ad directory system can also be used to facilitate distribution of the advertisements, tracking and monitoring of the effectiveness of the advertisements, and transfer of advertisement fees between the advertisers and the web site owners. The brand management system can use a brand monitor including a bot to monitor various different sites (e.g., popular forums, fan sites, etc.) through a keyword search, for example, The brand management system of the present invention provides one or more of, without being limited to, the following features: 1) identification of the sites that would be suitable or ideal for the brands and/or products of interest, instead of finding one site at a time; 2) quantitative assessment as to which site is truly better than another site; 3) quantitative measurement of ad effectiveness, by such information as how many customers actually purchased products as a result of a particular advertisement on a particular web site; 4) independent confirmation of advertisement tracking data provided by the web site operators; 5) ability to create banner and/or other images that are suitable or ideal for all of the sites on which the advertisements are placed, because separate ads may be required for certain specific sites, which makes tracking even more complicated since the advertiser must keep track of which ads go to which sites; and 6) saving the advertisers from having to re-do all of the advertising banners to reflect the changes and resubmit them to the appropriate sites, when the products change or a new feature is added.

As illustrated in FIG. 1, a brand management system 100 is coupled to advertisers 103, and is coupled to monitored sites 110, including ad sites 1 to N 104, 106, 108, over the global computer networks 102. The monitored sites 110 also include popular sites 109 that are not necessarily ad sites. By way of example, the popular sites may include large sites that are monitored but do not have ad sales provided through the brand management system 100. Consumers 112 (or computers thereof) are coupled to the ad sites 1 to N 104, 106, 108. The consumers generally would not directly access the brand management system 100.

The brand management system 100 is used for monitoring and marketing by one or more advertisers, for example, and may also be referred to as a brand monitoring and marketing system herein. The advertisers 103 represent one or more different advertisers, manufacturers, dealers or brand marketers who are using the services provided by the brand management system 100. Similarly, the monitored sites 110 represent one or more sites that are monitored by the brand management system 100 on behalf of the advertisers 103.

Figure 2:
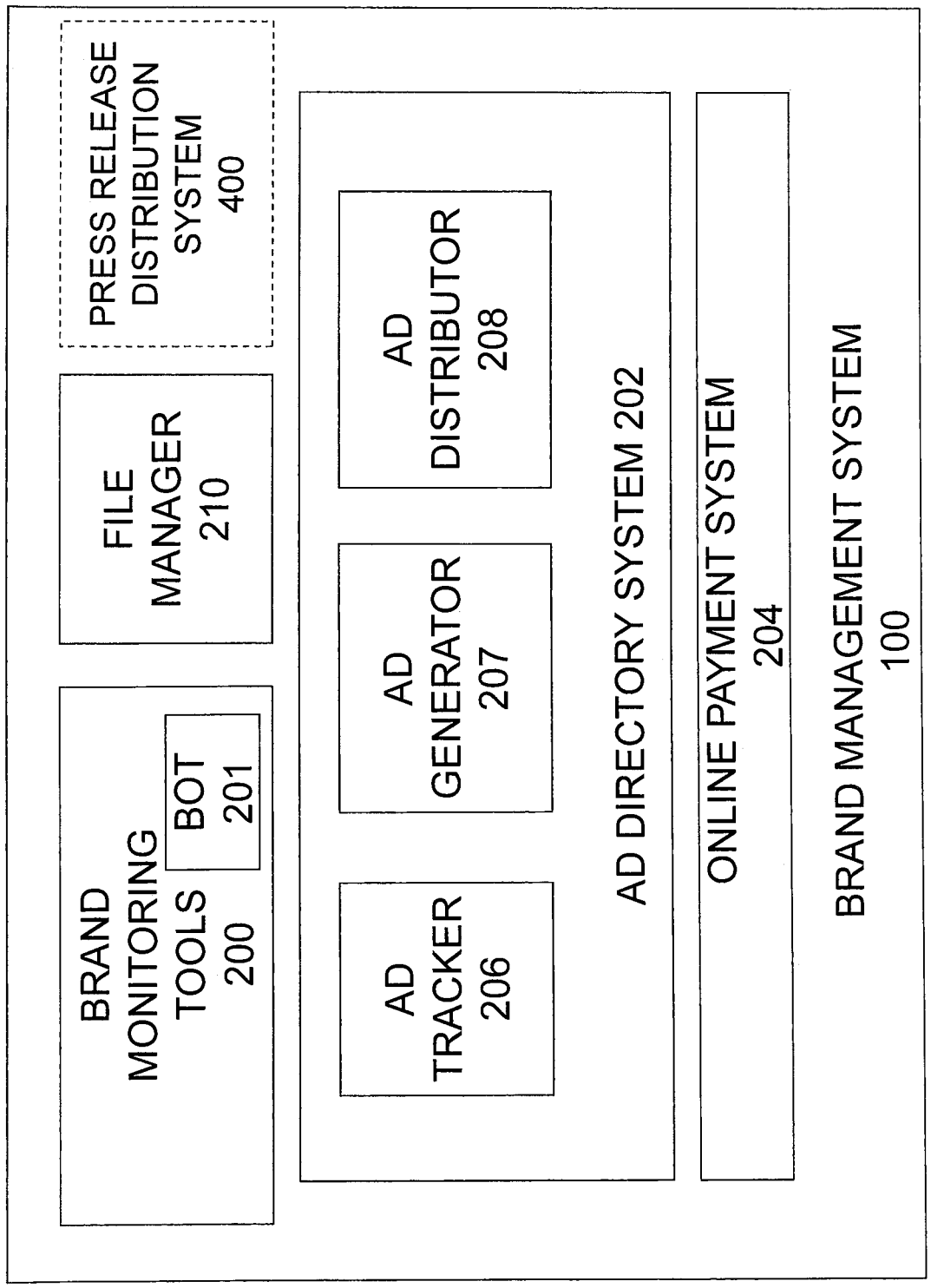
FIG. 2 is a block diagram showing components of the brand management system of FIG. 1.

As can be seen in FIG. 2, the brand management system 100 includes brand monitoring tools 200, an ad directory system 202, an online payment system 204, and a file manager 210. The ad directory system 202 includes an ad tracker 206, an ad generator 207 and an ad distributor 208. In one embodiment, the brand management system optionally includes a press release distribution system 400. The box 400 representing the press release distribution system 400 is shown in dotted lines because the press release distribution system 400 is optional. In addition, the press release distribution system 400 may be implemented in one or more other modules, such as the ad tracker 206, the ad distributor 208 and/or the file manager 210. Further, some of the components of the press release distribution system 400, such as, for example, press release plug-ins shown in FIG. 4 (or press release posters shown in FIG. 5) may be implemented at the forum sites, separately from the rest of the brand management system 100.

The brand monitoring tools 200 are used for monitoring the user forums, fan sites, etc. to afford advertisers or manufacturers an insight into how their products and/or brands are received or perceived in the market, especially by the relevant online community. The ad directory system 202 is for bringing together sellers and buyers of on-line advertisements, and includes ad tracking, ad generation and ad distributor features as follows. The ad generator 207 can be used by the advertisers or manufacturers to create or to modify online ads (e.g., including banners), while the ad distributor 208 and the ad tracker 206 can be used to distribute ads and to track effectiveness of ads, respectively. Alternatively, the advertisers or manufacturers can submit their own pre-created ads for distribution rather than using the ad generator 207.

By way of example, the ad directory system 202 facilitates the advertisements by the manufacturers/distributors by enabling them to create/submit/modify their own advertisements and placing them on the advertisement directory of the ad directory system 202. The advertisers may also post specific products and quantities/inventories available for sale for each product, such that transactions can be facilitated through the use of the brand management system 100. Hence, the brand management system 100 brings the sellers and purchasers together in an online community setting.

The transactions can be consummated through the use of the online payment system 204. The users of the ad directory system 100 can, in addition to purchasing products from the advertisers/manufacturers/distributors online, bid for products online, such that the ad directory system 202 can be used for advertising, selling, purchasing and/or bidding of various different products having different prices and in different quantities. All these transactions can be monitored using the ad tracker 206 such that the effectiveness of the ads and/or ad campaigns can be measured.

The file manager 210 can be used for online distribution of information related to products or brands (e.g., images, brochures, performance data, etc.) to the dealers and/or the consumers. Any advertising fee transactions between the advertisers and ad site owners can take place using the online payment system 204, for example.

Figure 4:
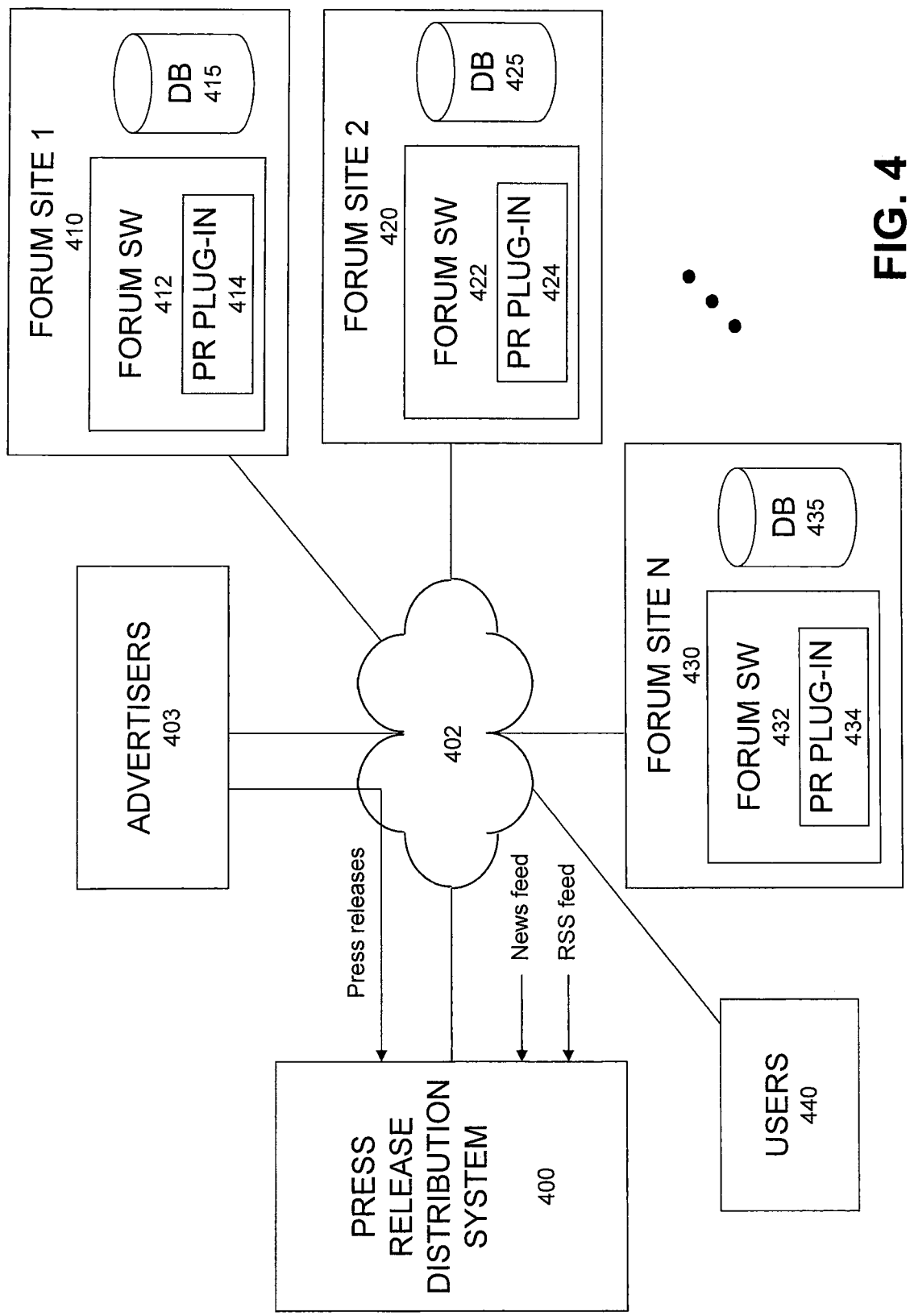
FIG. 4 is a configuration diagram of a press release distribution system coupled over the global computer networks to advertisers and forum sites in an embodiment in accordance with the present invention.

In other embodiments, the ad distributor 208 may also distribute press releases as ad units, and the ad tracker 206 may also track effectiveness of the press releases. In yet other embodiments, the file manager 210 may also be used to distribute the press releases. In still other embodiments, a separate press releases distribution system is used as a part of the brand management system 100 or as a separate system/module to receives press releases and other news, and distribute them to the advertisement sites (e.g., forum sites). One instance of such press release distribution system is illustrated in FIG. 4, and described in reference to FIGS. 4-6 below.

Search engine ranking, linked sites, eBay® postings, and other negative or positive product comments on forums and other web sites can have a dramatic impact on how a brand is perceived. This negative or positive "press" can also directly affect sales. Hence, in an exemplary embodiment, the brand management system 100 performs brand monitoring using the brand monitoring tools 200.

The brand monitoring tools 200 include a bot 201. The brand monitoring tools 200 may also include one or more other tools known to those skilled in the art. During brand monitoring, the bot is used to automatically monitor certain web sites and web postings for specific keywords. These keywords may appear as topics and/or content of discussions in different online forums. They may also appear as products for sale on Internet auction sites. Hence, the bot can be used to monitor/track various different web sites and/or web postings to search for particular keywords, brands, products, advertiser identifications, etc. to monitor how the monitored brands, products, etc. are characterized/perceived by the online community. By way of example, the bot can be targeted to one or more predetermined web sites. The user may also have flexibility to tailor monitoring of various different web sites and postings to fit his needs using the bot. The web sites searched can include one or more of, but are not limited to, eBay® and other auction site postings, Froogle™ posts, Epinions® posts, forum posts, search engines, number of links to the manufacturer's web site, Alexa® ranking, Google® Adwords®, Overture®, Groups, and the like.

EBAY® is a registered trademark of eBay Inc., a Delaware corporation; FROOGLE™ is a trademark of Google Technology Inc., a California corporation; EPINIONS® is a registered trademark of Epinions, Inc., a Delaware corporation; ALEXA® is a registered trademark of Alexa Internet Corporation, a California corporation; GOOGLE® and Adwords® are registered trademarks of Google Inc., a Delaware corporation; and OVERTURE® is a registered trademark of Overture Services, Inc. a Delaware corporation.

The advertiser, such as a brand owner and/or a product manufacturer, can select which keywords, trademarks, and phrases are relevant to their businesses. The advertiser can be given links to any posts that contain these keywords. This feature can be used, for example, to give the marketing manager an instant overview of the web activity that their brand is generating. For example, the marketing managers can have, all on one screen, a summary of Internet activities relevant to their brand.

The bot of the brand monitoring tools 200 should be more sophisticated than a normal bot, and should be used for checking Internet activities. In one embodiment, the bot is able to navigate web sites that require users to log in to the web site. In this embodiment, the bot is also able to look for specific data on each web page. Further, the bot is a programmable bot that can be customized for each site being monitored.

In one embodiment, the bot reports indexing failures to indicate changes to the web sites that may cause the bot to fail. "Behaviors" are programmed into the bot as many of these web sites have rules designed to exclude bots from using specific features on their sites. For example, some forums do not allow more than one search every 20 seconds to avoid bots overloading their servers. Those skilled in the art would know how to create/program a bot having one or more of the above features according to exemplary embodiments.

The ad directory system 202, which may also be referred to as an ad directory, of the brand management system 100 provides manufacturers or advertisers with a large directory of web sites related to a particular brand, such as top automotive enthusiast web sites. The manufacturers or advertisers can select web sites that they wish to advertise their brands or products on, using a system similar to an online shopping cart.

By aggregating and organizing these sites, the brand management system will enable advertisers to quickly create and manage ad campaigns across multiple web sites. For web sites selling advertising spaces, the ad directory system 202 will enable them to post their site information, ad programs, audience type, and ad rates. These enthusiast sites will have the option of having their traffic audited for an additional monthly fee. Such auditing process can be automated through an automated digital tracking system (e.g., pixeling), for example. These sites can be specially marked, for example, to indicate that their traffic has been audited.

Advertisers or manufacturers should be able to view these enthusiast sites by site type (e.g., make/model) and easily select multiple ad placements to create an online media buy. Web sites selling their placements through the brand management system 100 should be able to review requested placements and ads submitted by manufacturers. Once an ad placement is accepted by a particular web site, the brand management system 100 will automatically place the ad on that particular web site. The ad distributor 208 manages ad distribution, and the ad tracker 206 manages detailed ad tracking.

The ad tracker 206, which may also be referred to as an ad tracking system, would enable advertisers to easily track a variety of data per ad or per placement. Advertisers would be able to track information including contact form submissions, orders, number of shopping carts started, product pages viewed, and the like.

The ad generator 207, which may also be referred to as an ad generation system or an ad creation system, is a tool that can be used to generate ads that are suitable for all ad sites. The ad generator 207 can also be used to generate two or more ads, each of which is suitable for placement on one or more specific sites. In addition, the ad generator 207 can be used to convert existing ads on printed media to banner or other ads suitable for placement on web pages.

The ad distributor 208, which may also be referred to as an ad distribution system, provides the advertiser with the ability to remove and/or replace ads. Advertisers could also run multiple ads in rotation in one single placement. Optionally, advertisers may have the brand management system automatically disable the less effective one or more ads of a plurality of ads. Advertisers would be able to set which factor they wish to use in evaluating effectiveness including click-thrus, orders, contact form submissions, and/or the like.

In addition to traditional banner placements, the brand management system 100, or the ad distributor 208 thereof, will enable advertisers to distribute online press releases, or choose keyword-related placements tied to text or image ads on the ad sites, which may be enthusiast sites.

An online media buy may include dozens of web sites, so organizing and tracking these payments online will be important for advertisers. The brand management system 100 can process the transactions for the placement fees through its online payment system 204 using a model similar to that of an application service provider (ASP) model. By way of example, monthly fees may be charged by the ad sites through the online payment system 204 for placing advertisements. Advertiser/site feedback may also be incorporated into the brand management system 100. The online payment system 204 can also be used by the advertisers and/or the ad sites to pay for services provided by the brand management system 100.

A model similar to the ASP model can also be used between the advertisers and/or ad sites and the brand management system 100. By way of example, a model similar to the ASP can be used to implement the transactions between the advertisers and/or the ad sites and the brand management system 100. This way, the brand management system 100 can charge a monthly access fee to the advertisers and/or ad sites for buying and selling of ad spaces.

There are at least two fees that are associated with the brand management system of the present invention. A first fee is an access fee to access the system for brand monitoring and to access ad directory. The access fee can be a monthly ASP style fee, and it is conceivable that some customers may only pay this monthly access fee but not buy any ads. The online payment system 204 is used to pay for the placement of the ads. The operator of the brand management system, for example, may keep a percentage of revenue generated through all of the transactions involving purchasing ad spaces and placing ads.

Figure 3:
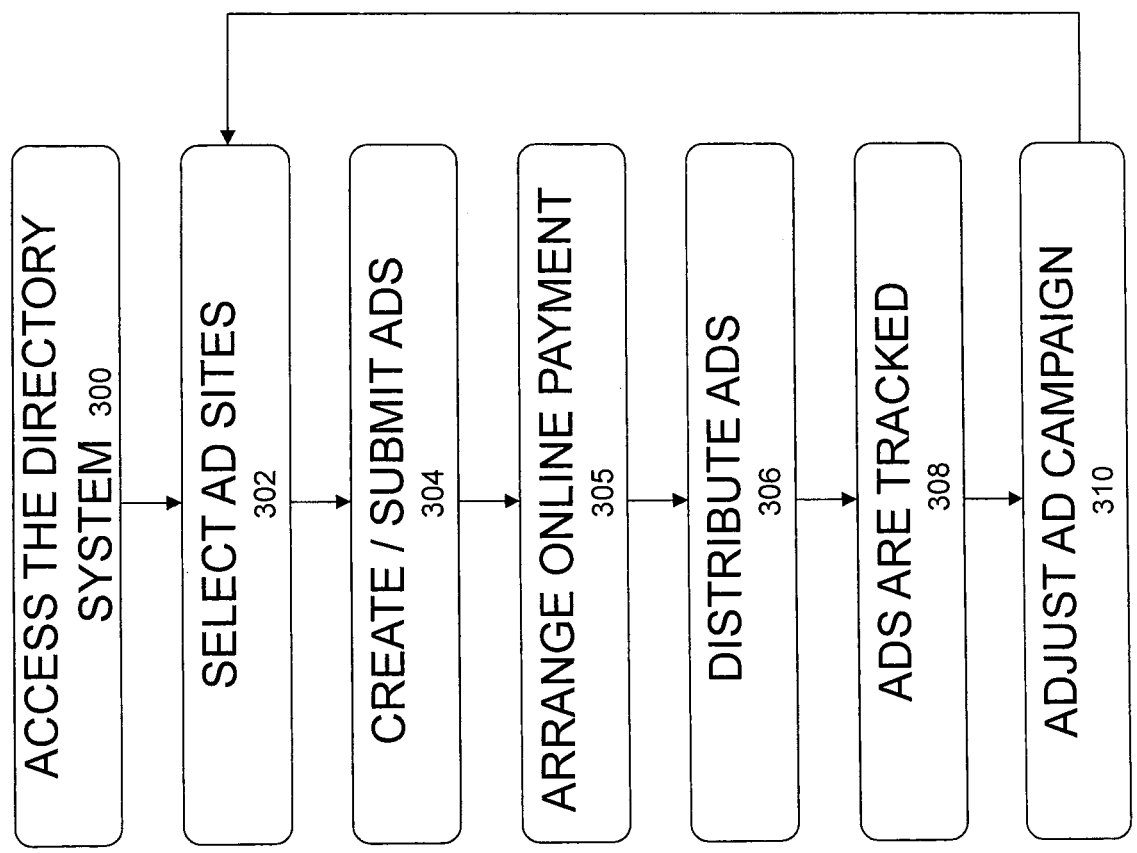
FIG. 3 is a flow diagram illustrating the process of using the brand management system for ad placement and tracking in an exemplary embodiment of the present invention.

According to FIG. 3, the advertiser or manufacturer first accesses the ad directory system (300). The ad directory system contains information on available ad sites corresponding to the products or brands of interest. The advertiser or manufacturer selects ad sites based on the site type (e.g., catering to the specific industry) and/or the like (302).

The advertiser or manufacturer may already have available ads, or they may wish to modify existing ads and/or create new ads using the tools available in the brand management system, such as the ad generator 207 (304). After selection of the ad sites and the creation/submission of the ads, a payment is arranged (305), for example, through the online payment system 204. Then, the ads are distributed to the selected ad sites (306). The effectiveness of the ads can be tracked (308) using the ad tracker 206, for example. The ad campaign can then be adjusted (310) using factors such as effectiveness of the various different ad sites.

Further, advertisers or manufactures can gain detailed tracking information by using the brand management system 100. By way of example, a total summary for the campaign may show total clicks, total impressions, click-through rates (CTR) and total user actions, all of which can be tracked, such that ads can be tied to some user activity such as a dealer search, product page view, contact form submission, or an online order. This way, one or more user activities associated with the advertisements can be tracked/monitored.

In addition, manufacturers or advertisers can distribute ads evenly or remove ineffective ads after so many days or after so many impressions. Further, the advertisers or manufactures can remove or edit existing ads or generate new ads. This way, advertisers or manufactures can quickly change ads on multiple sites, run multiple ads in one placement, run different ads based on time of day, and/or remove ineffective ads without having to resubmit the ads manually to multiple site owners.

Currently, product images, documents, and data are typically distributed by burning the data onto CD-ROMs as their dealers request them. By moving this functionality online, the manufacturer will gain several benefits including, but not limited to, reduced labor costs associated with distributing materials to dealers and media and reduced CD media and postage costs.

The file manager 210 is a part of a suite of tools (i.e., the brand management system 100) that address the common needs of advertisers or manufacturers, such as the automotive aftermarket industry.

The file manager 210 should enable advertisers or manufacturers to do one or more of, but not limited to, the following: 1) upload various documents and images; 2) upload large images and automatically have "thumbnail" previews created; 3) organize documents and images into categories and/or subcategories; 4) establish access rights depending on user type; 5) track downloads by user and by file; and 6) provide news/updates to dealers.

Further, the file manager 210 should enable manufacturers' dealers to do one or more of, but not limited to, the following: 1) view thumbnails of images (created automatically by the system); 2) search for files by a keyword; 3) browse files by category/subcategory; 4) select multiple files or download entire categories of files; and 5) quickly see new files uploaded since the last login.

While the present application has been described mainly in reference to the automotive aftermarket, the directory system in exemplary embodiments of the present invention can be applied to any suitable market with strong enthusiast following online. The sites and market segments having such strong enthusiast following online, may include wedding sites, golf, professional wrestling, and the like.

As discussed above, in embodiments in accordance with the present invention, the following strategy is used, for example, for brand monitoring, marketing and management: 1) A large number of small automotive forums (publishers) are aggregated into one automotive network; 2) The clients are enabled to easily create online ad campaigns by selecting various publishers; 3) The advertisers are enabled to upload, distribute, and track ad banners across these publishers; 4) The brand monitoring and marketing system will automatically monitor posts on these sites to see if anything negative or positive is said about the advertiser; and 5) Other online services will be provided to advertisers through the brand monitoring and marketing system (e.g., e-commerce, etc.).

In another embodiment in accordance with the present invention, a press release distribution system is used to inject or post press releases into the forum. The press releases can include text, video, graphics, images, multimedia, programming, and/or any other suitable information as those skilled in the art would appreciate. Here, each of the press releases may be viewed or referred to as an ad unit that can be embedded into the forums.

As shown in FIG. 4, a press release (PR) distribution system 400 in an embodiment in accordance with the present invention, is coupled to advertisers 403 and forum sites 1 to N (410, 420, 430), wherein N is an integer greater than or equal to 3. In the described embodiment, there is no limit to the number of forum sites that the press release distribution system 400 is coupled with. The press release distribution system 400 receives press releases, news feed and/or Really Simple Syndication (RSS) feed over a network 402, which may be a global computer network or the Internet, or any other suitable network known to those skilled in the art. The press release distribution system 400 may be a part of a brand management system 100, or may be a standard alone system. Such stand alone press release distribution system may be coupled or not coupled with the brand management system 100. One embodiment of the press release system 400 may be referred to as POSTRELEASE™, which is a trademark of CIE Studios, LLC, Long Beach, Calif.

In the example depicted in FIG. 4, the press release distribution system 400 receives press releases from the advertisers 403. In other embodiments, the press release distribution system 400 may receive the press releases in any other suitable manner over the network 402 or otherwise. Further, the news and RSS feeds may be provided using any suitable method over the network 402 or otherwise, as those skilled in the art would appreciate. Any advertisements including text and/or graphics can also be distributed and posted directly into forums using the press release distribution system 400, of course. The press releases are posted on (or inserted into) the forum (or forum site) as a message or an announcement. The "message" may also be referred to as a "post" throughout this specification. Further, the "message" is not limited to text, but may also include one or more of images, video, web site code, Flash, or any other suitable information or data.

As can be seen in FIG. 4, one or more users 440 (i.e., computers or other network devices thereof) are also coupled to the forum sites 1-N (410, 420, 430) via the network 402. The users 440 are consumers who may be members or users of the forum sites 1-N. The press releases posted on the forum sites 1-N will be read by the users 440 of the corresponding forum sites. The users 440 upload posts at the forum sites, and also read the posts of interest from the forum sites. These user activities can be used or analyzed to generate personal/marketing profiles for the users. While only one box 400 is used to designate the users in FIG. 4, the users of course can be located at multiple different locations (e.g., across the globe).

The press release distribution system 400 may be included in the brand management system 100 of FIGS. 1 and 2, for example, or implemented as a system separate from the brand management system 100 on the same or different server from that of the brand management system 100. In other embodiments, the features and functions of the press release distribution system 400 are implemented in other modules of the brand management system 100, such as the ad tracker 206, the ad distributor 208 and/or the file manager 210.

The forum site 1 (410) runs forum software 412; the forum site 2 (420) runs forum software 422; and the forum site N (430) runs forum software 432. The forum software 412, 422 and 432 respectively have installed therein, respective press release (PR) plug-ins (or plug-in modules) 414, 424 and 434. The press release plug-ins may also be referred to as press release interface plug-ins herein. The forum software may be VBulletin or any other forum software available to those skilled in the art. Those skilled in the art would appreciate that the plug-in modules are designed and developed to work with one or more desired forum software. The press release plug-in module receives the press releases and/or other news from the press release distribution system 400, and posts the received press releases and/or other news on the corresponding forum site. Alternatively, the press release distribution system 400 and the press release plug-ins may together also be referred to as a press release distribution system.

Each of the forum sites 1 to N (410, 420, 430) also includes a respective one of databases 415, 425 and 435. The database includes user data, e.g., name, birth date/age, gender, occupation, address, e-mail address, phone number, and/or any other personal data required (or optionally requested) by the forum site for registration as a member. The database also includes the forum postings, traffic and forum activities, and may also include history and/or archive of the forum postings, traffic and forum activities. The forum activities may include the activities of the users/members while logged onto the forum site, such as the posts downloaded/read and posts written/uploaded by the users.

In one embodiment, the press release plug-in module is used to monitor the posts, user information, user behavior, and/or other forum activity at the corresponding forum site. By way of example, most forum sites require that the users be registered as members in order to post on forums, while non-registered users can still view the site and posts thereon. Also, most forums are broken down by topic areas. Further, the registration process on many forums including nearly all automotive forums require age information and optional location, occupation, and other personal data. The press release plug-in in one embodiment uses such personal data and by tracking the content of each message the user posts and reads, to develop a marketing profile for that user. Further, almost every forum has a search feature or function, and the search activity of the user (e.g., search terms or keywords used by the user during the search) can also be used to create user profile. As such, the plug-in module in one embodiment monitors the forum activity of the user and uses that information to create a marketing profile (or user profile) and then deliver ads against that profile for a targeted advertising. By way of example, in one embodiment, the marketing profile (or user profile) can be created by analyzing the posts/messages that the user reads, the posts/messages that the user creates, and/or the profile information the user entered when the user created his/her account on the forum.

By way of example, if someone is viewing a post thread about wheels and he responds to the thread, the press release plug-in module can be used to determine that that particular user may have an interest in wheels, and deliver wheel ads to that user. Alternatively, the press release plug-in module may provide the user activity information to the press release distribution system 400 for such analysis/determination. As such, in the described embodiment, the press release distribution system 400 is integrated into existing forum sites using the press release plug-in modules, rather than sites specifically developed for operating with the press release distribution system. Hence, the press release distribution system 400 draws existing data from forums (i.e., mines already existing data) that are generated by user activities on forums. To get these forum sites to join the network of press release distribution system 400, a revenue sharing may be instituted, in which the press release distribution system 400 delivers ads and shares revenue, as many of these forum sites, despite having great traffic, typically need help to generate revenue from the traffic.

In other embodiments, the forum software may already include a press release interface module for receiving and posting press releases from the press release distribution system 400 and for monitoring user data and forum activity thereof, such that a separate plug-in module is not necessary. Hence, while the press release interface plug-in module is installed separately by the forum site owner, the site owner needs only install the forum software when it already includes the features and functions of the press release interface plug-in module.

The press release distribution system 400 in one embodiment limits the time period during which particular press releases are posted at one or more forums. Further, in one embodiment, the press release distribution system 400 (either alone or together with the forum software and/or the press release interface plug-in module) limits the frequency at which the press releases are displayed for each user. The press release distribution system 400 in one embodiment also tracks the result (i.e., effectiveness) of the press release distribution campaigns.

As shown in FIG. 4, therefore, press releases, news and/or advertisements from/related to the advertisers 403 of particular brand or product can be directed to particular one or more forum sites in accordance with the relationship or relatedness between the press releases, news, advertisements, advertisers, brand, product and the forum sites. By way of example, press releases, advertisement, etc. from aftermarket automotive parts manufacturers will be directed to forum sites of auto enthusiasts and press releases, advertisements, etc. from golf club manufacturers will be directed to golf enthusiast forum sites. Further, in one embodiment, the press releases, advertisements, news, etc. are directed to one or more particular users/members of the forum sites in accordance with the user profiles and/or user activities at the forum site. By way of example, a user actively reading or uploading on threads on multi-function cellular phones will be targeted to be provided with press releases and/or advertisements from cellular phone manufacturers.

Figure 5:
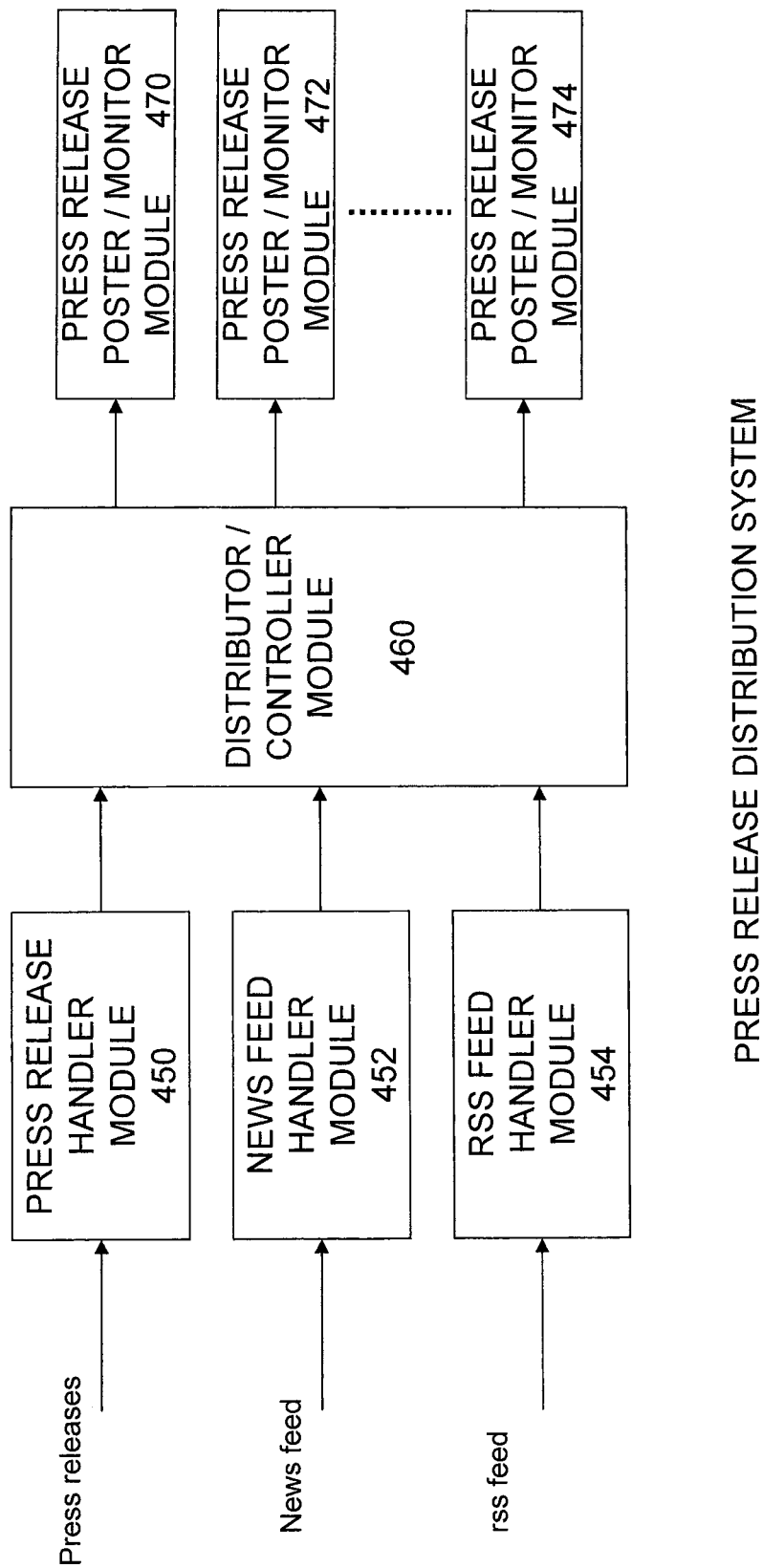
FIG. 5 is a conceptualized block diagram of the press release distribution system of FIG. 4 in one embodiment according to the present invention.

FIG. 5 is a conceptual block diagram of the press release distribution system 400 of FIG. 4. As shown in FIG. 5, the press release distribution system includes a press release handler module (or press release handler) 450, a news feed handler module (or news feed handler) 452 and an rss feed handler module (or rss feed handler) 454 for receiving and handling press releases, news feed, and rss feed, respectively. The press release handler module 450, the news feed handler module 452 and the rss feed handler module, either together or separately, may also be referred to as an input handler or input handler module. The term "module" is used throughout this specification to refer to any hardware, software, firmware, application, tool, widget, plug-in, any other suitable processing apparatus or method known to those skilled in the art to implement the described functions, or any combinations thereof.

The press release distribution system 400 also includes a distributor/controller module 460 (to be referred to hereinafter as "distributor" or "distributor module") 460. The distributor module 460 receives the press releases, news feed and rss feed, and provide them to one or more press release poster/monitor modules (to be referred to hereinafter as "press release posters" or "press release poster modules") 470, 472, 474 to be posted at the respective forum sites. In one embodiment, each of the press release poster modules 470, 472 and 474 posts or inserts the press releases as a message on the forum (or forum site). In one embodiment, the press release poster modules 470, 472, 474 are implemented as plug-ins, such as the PR interface plug-ins 414, 424 and 434 of FIG. 4.

In addition to posting the press releases, news feed, and rss feed, the press release poster modules 470, 472, 474 monitor user data and/or forum activities of one or more users at respective forum sites. The press release poster module 470, 472 or 474 may analyze the user data and/or forum activity data. Alternatively or in addition to the analysis of the user data and/or forum activity data in the press release poster modules 470, 472, 474, in one embodiment, the distributor module 460 analyzes the user data and/or the forum activities. The distributor module 460 may also receive the result of the analysis of one or more of the press release poster modules 470, 472 or 474, and further analyze such analysis result. Then the distributor module 460 uses the analysis result to target the user/forum site to direct the press releases, news, advertisements, messages and/or non-"press" events. Therefore, in one embodiment, the distributor module 460 analyzes or further analyzes the user/forum activity data, and/or controls providing press releases, news, rss feed, messages, non-"press" events, and/or advertisements to the forum sites and/or the users. The press release poster modules 470, 472 and 474 are not limited to posting press releases and/or monitoring the user data/forum activities, but may be used to post other information such as, for example, advertisements, other news, messages and/or non-"press" events, or any other information suitable for posting on one or more forum sites.

Figure 6:
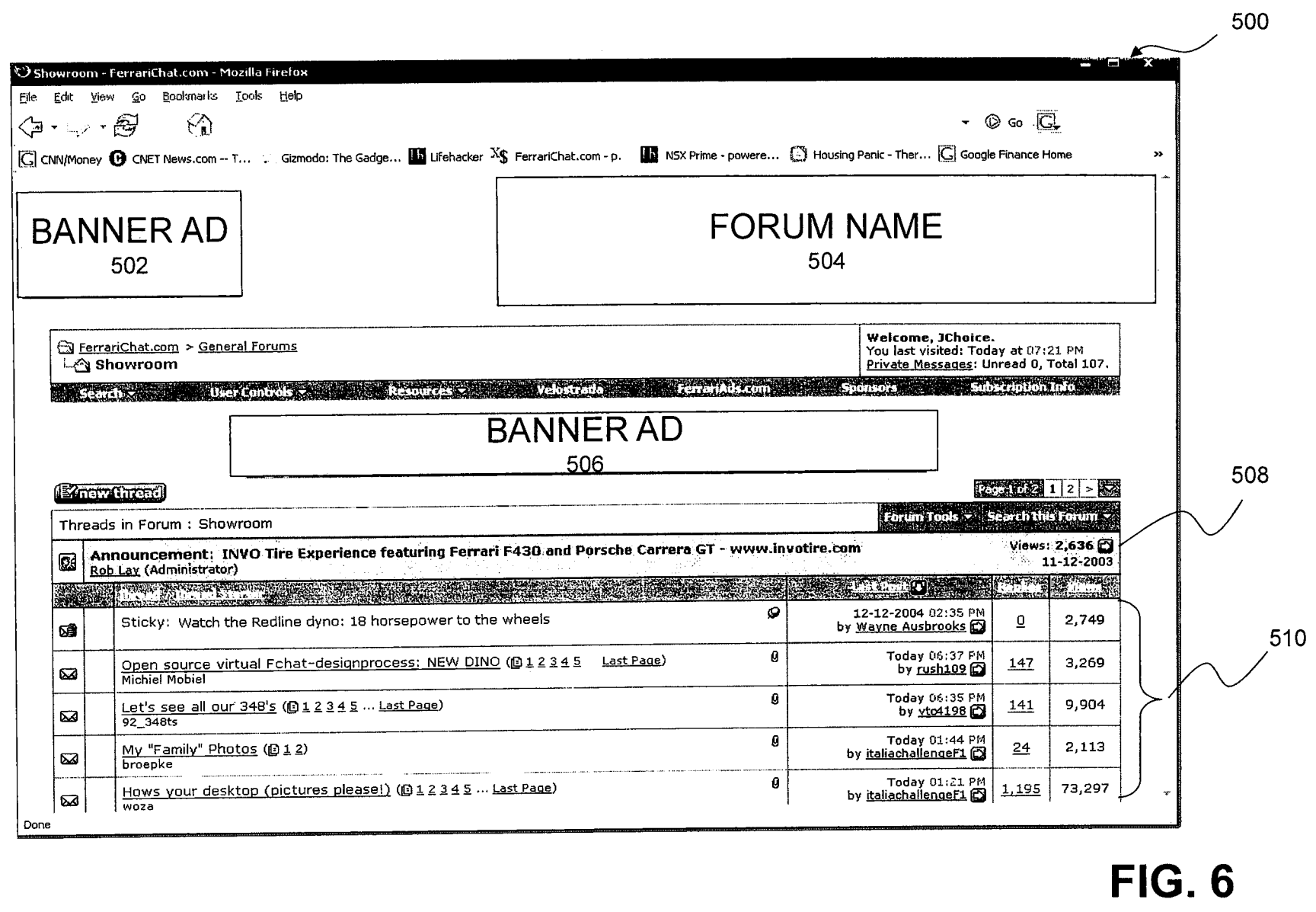

As can be seen in the schematic view of a screen shot of a forum site home page 500 in FIG. 6, the home page of a forum site typically includes a forum name 504 and one or more banner ads 502, 506. The home page typically displays one or more posts 510 posted by the members of the forum. Such posts may include threads initiated by a particular posting or postings. The home page 500 also displays a press release 508, which is displayed with a background color (e.g., red) different from that of the member posts 510. This way, press releases from the advertisers 403 can be brought to the immediate attention of the forum member. In other embodiments, the press release post (or the alert thereof) may be displayed with other background color, distinguishing font and/or text format (e.g., bold text) as those skilled in the art would appreciate. Such press releases can be viewed and referred to as ad units in the described embodiment, and may be effective advertisements directed at particular forum sites, and/or particular members or users. While the press release 508 is shown as an announcement in FIG. 6, the press release 508 may be posted or inserted as a message in other embodiments.

Figure 7:
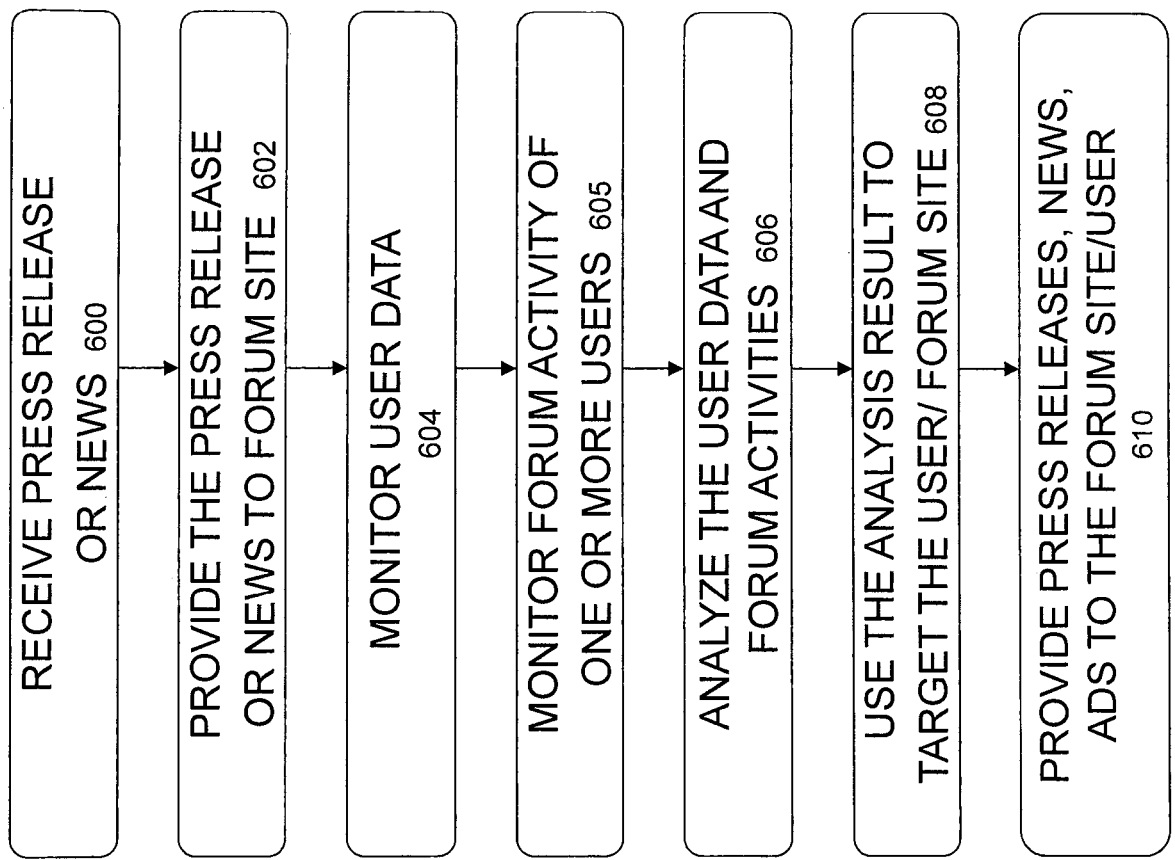
FIG. 7 is a flow diagram of the operation of the press release distribution system in one embodiment in accordance with the present invention.

FIG. 7 illustrates a flow diagram showing an operation of the press release distribution system in one embodiment in accordance with the present invention. The flow diagram of FIG. 7 will be described in reference to FIGS. 4, 5 and 7. The press release distribution system 400 first receives a press release or news (600). The press release may have originated from one of the advertisers 403 who desires to use the press release as an advertisement to be distributed to the forum sites of interest. By way of example, the advertiser may be a manufacturer of after market auto parts who desires to distribute a press release regarding a scheduled release of a new product to the auto enthusiast fan or forum sites. The press release distribution system 400 may also receive news or RSS feed relevant to one or more of its associated forum sites 1-N (410, 420, 430), and distribute the news or other information to the forum sites and/or users/members of the forum sites.

The press release distribution system 400 then distributes the press release or news to the relevant forum sites (602). The press release interface plug-in (414, 424 or 434) in the forum software (412, 422 or 432) of these forum sites posts such press release or news at the forum to be viewed by the members and visitors of the forum site.

The press release plug-in module also monitors user data (e.g., stored in the database 415, 425 or 435) or the respective forum site (604). Such user data is gathered from the users/members by the forum sites at the time of registration or at any other suitable time. The database at the forum site also includes information regarding user activities. By way of example, the database may include such forum activities as reading the posts (or threads thereof) or writing posts onto the forum sites. The press release plug-in also monitors these forum activities of one or more users/members (605). The monitored information may be gathered and analyzed by the press release plug-in and/or may be provided to the press release distribution system to be analyzed to generate user profiles (606). Based on such user profiles, the press release distribution system can target particular forum sites and/or members thereof to direct the press releases, news and/or advertisements (608). Hence, based on the user profiles, particular press releases, advertisements and/or news can be directed (or provided) to the particular forums and/or users (610).

While certain exemplary embodiments have been described above in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention.

What is claimed is:

1. A brand management system that receives advertisements as sponsored posts from one or more server computers coupled to one or more user computers and a websites over a communication network, the system configured to post the sponsored posts on one or more forum sites among the plurality of websites over a computer network, each of the forum sites for uploading posts by one or more forum site members, each of the posts comprises a content viewable by one or more forum site members, the system configured to:

use monitored forum site member data and forum site member activity on one or more of the websites, wherein the forum site member activity comprises uploading one or more posts to the forum sites;

request a first sponsor post from the server computer over a communication network based on monitored forum site member data or activity;

cause the post of the first sponsor post among one or more posts uploaded by the forum site members on the forum sites, wherein each of the forum sites is directed to at least one forum site member, wherein the posting the first sponsor post comprises displaying the first sponsor post content separately from any banner advertisement or static header on the forum site and embedding the first sponsor post content contiguously together with at least some of the posts uploaded by the forum site members such that the first sponsor post scrolls together with the posts uploaded by forum site members on the forum sites, and the first sponsor post is placed in a fixed position relative to the contiguous posts uploaded by the forum site members;

use tracked data comprising one or more of impressions, clicks, click-through rate, or forum site member actions with respect to the first sponsor post; and cause the first sponsor post to be replaced based on the impressions, clicks, click-through rate, or forum site member actions with respect to the first sponsor post.

2. The system of claim 1, wherein the sponsored post comprises a press release, news, announcement, message, news feed, advertisement, or non-"press" event.

3. The system of claim 1, wherein the non-sponsored post comprises one or more of messages.

4. The system of claim 1, wherein the communication network is the Internet.

5. The system of claim 1, wherein each of the one or more websites comprises forum sites, fan sites, popular sites, enthusiast sites, online communities, message forums, forum, or popular forums.

6. The system of claim 1, wherein the brand management system is further configured to generate member profiles from the monitored forum site member data or activity at one or more of the websites on which the sponsored posts are placed.

7. The system of claim 1, wherein the forum site member activity at one or more of the websites comprise one or more of non-sponsored posts, reads of sponsored posts, or searches at one or more of websites on which the sponsored posts are placed.

8. The system of claim 1, wherein the sponsored post further comprises text.

9. The system of claim 1, wherein the sponsored post is displayed with a background color or another distinguishing feature to denote it as being different from the non-sponsored posts.

10. The system of claim 1, wherein the brand management system is further configured to monitor the websites for specific keywords.

11. A method of electronically delivering advertisements as sponsored posts to be displayed on one or more forum sites over a computer network, each of the forum sites for uploading posts by one or more forum site members, each of the posts comprises a content viewable by one or more forum site members, the method comprising:

electronically using monitored forum site member data and forum site member activity with respect to one or more of the websites, wherein the forum site member activity comprises uploading one or more posts to the forum sites;

electronically requesting a first sponsor post from a server computer over a communication network based on monitored forum site member data or activity;

electronically causing the posting of the first sponsor post among one or more posts uploaded by the forum site members on the forum sites, wherein each of the forum sites is directed to at least one forum site member, wherein the posting the first sponsor post comprises displaying the first sponsor post content separately from any banner advertisement or static header on the forum site and embedding the first sponsor post content contiguously together with at least some of the posts uploaded by the forum site members such that the first sponsor post scrolls together with the posts uploaded by the forum site members on the forum sites, and the first sponsor post is placed in a fixed position relative to the contiguous posts uploaded by the forum site members;

electronically using tracking data comprising one or more of impressions, clicks, click-through rate, or forum site member actions with respect to the first sponsor post; and electronically causing the first sponsor post to be changed based on the impressions, clicks, click-through rate, or forum site member actions with respect to the first sponsor post.

12. The method of claim 11, wherein the sponsored post comprises a press release, news, announcement, message, news feed, advertisement, or non-"press" event.

13. The method of claim 11, wherein the non-sponsored post comprises one or more of messages.

14. The method of claim 11, wherein the communication network is the Internet.

15. The method of claim 11, wherein each of the one or more websites comprises forum sites, fan sites, popular sites, enthusiast sites, online communities, message forums, member forum, or popular forums.

16. The method of claim 11, further comprising electronically generating member profiles from the monitored forum site member data or activity at one or more of the websites on which the sponsored posts are placed.

17. The method of claim 11, wherein the forum site member activity at one or more of the websites on which the sponsored posts are placed comprise one or more of non-sponsored posts, reads of sponsored posts, or searches at one or more of the websites on which the sponsored posts are placed.

18. The method of claim 11, wherein the sponsored post further comprises text.

19. The method of claim 11, further comprising electronically to monitoring the websites for specific keywords.

20. The method of claim 11, further comprising electronically posting the sponsored posts among the non-sponsored posts at each of multiple websites, and electronically monitoring forum site member data or forum site member activity at each of the multiple websites.

21. The method of claim 11, wherein the changing of the first sponsor post comprises modifying the first sponsor post.

22. The method of claim 11, wherein the changing of the first sponsor post comprises replacing the first sponsor post.

23. The method of claim 11, wherein the changing of the first sponsor post comprises time limiting the first sponsor post.

24. A method of electronically delivering advertisements as sponsored posts to one or more websites over a computer network, each of the websites includes non-sponsor posts, each of the sponsored posts and non-sponsored posts comprising a content viewable by one or more users, the method comprising:

using monitored user data and user activity with respect to one or more of the websites;

providing one or more sponsored posts over a communication network based on monitored user data or activity;

causing to display one or more sponsored posts among one or more non-sponsored posts on one or more websites, wherein the causing to display the one or more sponsored posts on each website comprises placing the one or more sponsored post separately from any banner advertisement or static header on the one or more websites and contiguously together with one or more of the non-sponsored posts such that the one or more sponsored posts scroll together with the one or more non-sponsored posts, and the one or more sponsored post are placed in a fixed position relative to one or more of the contiguous non-sponsored posts;

using tracked impressions, clicks, click-through rate, or user actions with respect to the one or more sponsored posts on one or more of the websites; and causing one or more of the sponsored posts to be changed based on the impressions, clicks, click-through rate, or user actions with respect to one or more sponsored post on one or more of the websites.

25. The method of claim 24, wherein the sponsored post comprises a press release, news, announcement, message, news feed, advertisement, or non-"press" event.

26. The method of claim 24, wherein the non-sponsored post comprises one or more of images and text.

27. The method of claim 24, wherein each of the one or more websites comprises forum sites, fan sites, popular sites, enthusiast sites, online communities, message forums, member forum, or popular forums.

28. The method of claim 24, further comprising electronically generating user profiles from the monitored user data or activity at one or more of the websites on which the sponsored posts are placed.

29. The method of claim 24, wherein the user member activity at one or more of the websites on which the sponsored posts are placed comprises one or more of non-sponsored posts, reads of sponsored posts, or searches at one or more of the websites on which the sponsored posts are placed.

30. The method of claim 24, further comprising electronically to monitoring the websites for specific keywords.

31. The method of claim 24, further comprising electronically posting the sponsored posts among the non-sponsored posts at each of multiple websites, and electronically monitoring user data or activity at each of the multiple websites.

32. The method of claim 24, wherein the changing of the first comprises modifying the first sponsor post.

33. The method of claim 24, wherein the changing of the sponsor post comprises replacing the first sponsor post.

34. The method of claim 24, wherein the changing of the sponsor post comprises time limiting the first sponsor post.

* * * * *